United States Patent [19]

Aliphat et al.

[11] Patent Number: 5,725,771
[45] Date of Patent: Mar. 10, 1998

[54] PROCESS FOR ENZYME PRETREATMENT OF DRILL CUTTINGS

[75] Inventors: Sophie Aliphat; Frédéric Perie, both of Billere; Christian Zurdo, Pau; Alain Martignon, Sainte Marie, all of France

[73] Assignee: Elf Aquitaine Production, Coubevoie, France

[21] Appl. No.: 632,099

[22] Filed: Apr. 15, 1996

Related U.S. Application Data

[63] Continuation of Ser. No. 561,008, Nov. 21, 1995.

[30] Foreign Application Priority Data

Nov. 21, 1994 [FR] France ................................ 94 13921

[51] Int. Cl.$^6$ .......................................................... C02F 3/34
[52] U.S. Cl. ........................ 210/606; 210/610; 210/632; 507/211; 507/936
[58] Field of Search ........................... 210/606, 610, 210/611, 631, 632; 507/118–121, 110, 211, 936

[56] References Cited

U.S. PATENT DOCUMENTS

| | | | |
|---|---|---|---|
| 4,143,007 | 3/1979 | De Martino | 507/211 |
| 4,329,448 | 5/1982 | Cox et al. | 507/211 |
| 4,468,334 | 8/1984 | Cox et al. | 507/211 |
| 4,535,153 | 8/1985 | Kang | 507/110 |
| 5,606,105 | 2/1997 | Davis et al. | 502/8 |

*Primary Examiner*—Thomas G. Wyse
*Attorney, Agent, or Firm*—Birch, Stewart, Kolasch & Birch, LLP

[57] ABSTRACT

Process for the treatment of drilling muds recovered at the surface of the ground, especially synthetic muds, characterized in that it comprises at least one stage of hydrolysis of said mud by means of a lipase.

15 Claims, 1 Drawing Sheet

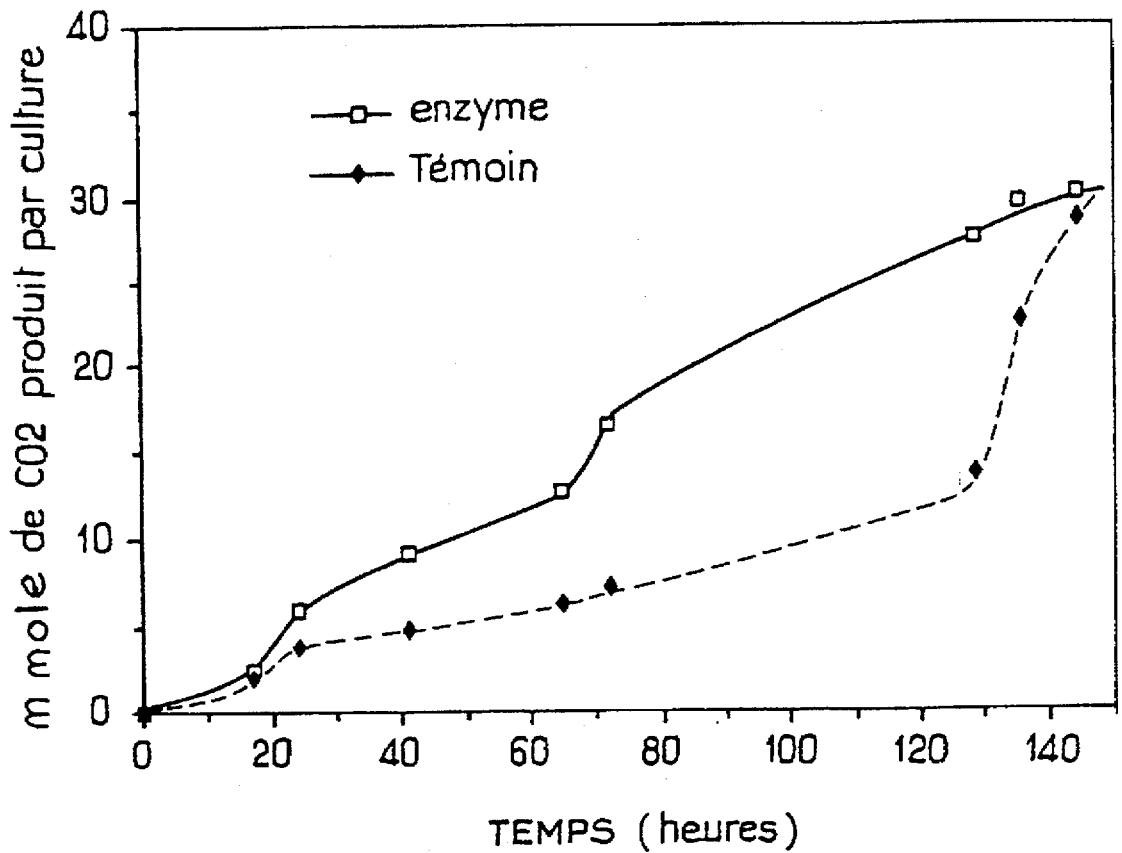
FIG_1

PROCESS FOR ENZYME PRETREATMENT OF DRILL CUTTINGS

This application is a continuation of copending application Ser. No. 08/561,008, filed on Nov. 21, 1995.

The present invention relates to a process for enzyme pretreatment of cuttings recovered from the drilling muds brought up from the well, and more particularly the large cuttings removed by screening and remaining impregnated with mud. It relates more particularly to the cuttings impregnated with so-called replacement muds.

When a borehole is being drilled, the mud plays an essential part; it is responsible for bringing up the cuttings originating from the formation dug at the well bottom, their lubrication by coating and the cooling of the drill bit. However, on leaving the well, the mineral rock fragments of which these cuttings consist must be separated from the mud by successive screenings and sedimentation. Thus screened and sedimented, the mud can be recycled into the well for a new drilling cycle.

The problem of the recovery and storage of the cuttings arises in parallel with this recycling of the mud. While this problem is already tricky on a production field, it is much more difficult to solve on an oil platform because the constraints where environmental regulations are concerned are much stricter, especially as cuttings can only be dumped out at sea, for this to be economically viable.

Furthermore, this dumping of the cuttings at sea will depend essentially on the nature of the mud employed, which is more or less toxic or biodegradable.

Various types of muds are employed for drilling. These are, first of all, water-borne muds in which the predominant organic fraction is based on cellulose, cellulose derivatives and acrylic acid derivatives. These muds are easily biodegradable and do not give rise to potential damage to the environment. However, these muds are difficult to employ in drilling conditions, which does not promote their use. Oil-borne muds are economically preferred to these; they consist essentially of a stabilized reverse emulsion of water in oil, generally gas oil, and their rheological properties are adjusted by means of viscosity-modifying, densifying and other additives. However, they represent a very high pollution risk, because they are not easily biodegradable and are toxic. A third type of muds, called replacement muds, is employed above all as a replacement for oil-borne muds, but these are still deemed too polluting owing to their organic filler esters as a stabilized emulsion or from polyglycols, polyethylene glycol or poly-alpha-olefins.

These muds were developed to avoid employing gas oil and fuel oil in the formulation of oil-borne muds. While they have some of the rheological characteristics of gas oil without being toxic, they are just as slowly and/or sparingly biodegradable as the latter.

In the present state of legislation in force relating to dumping at sea, oil-borne muds are prohibited even in the case where cuttings are not dumped at sea. Furthermore, it may be expected that replacement muds, whose first criterion of choice is not biodegradability, will also be prohibited in the future.

So far, the biodegradability of these ester-based muds has been demonstrated (see the paper by J. Steber, C. P. Herold (Hankel KGaA) and J. M. Limia (Baroid), Offshore, 60, September 1984). However, although efficient, the proposed biodegradation treatments are very lengthy, requiring storage of the cuttings, which is difficult to implement especially at sea on oil platforms, where space is at a premium.

The present invention is aimed at accelerating the biodegradation of the muds and more particularly of ester-based replacement muds by an enzyme treatment preceding the bacteriological treatment usually practised.

Enzyme treatments of muds in general are known, especially in order to increase their permeability in the formation at the bottom of a well, as described in German Patent DD 240905 of 13.9.85. Other treatments as described in U.S. Pat. No. 5,126,051 make use of enzymatic hydrolysis reactions by means of cellulases, with a view to degrading the cellulose-derived residual viscosity-increasing compounds originating from the mud and present in homogeneous solutions resulting from the sedimentation of the rock fines brought up by the mud which has been screened and rid of large cuttings. This patent is concerned with breaking the homogeneity of this liquid in order to obtain two phases, one consisting of divided solids which can be recycled in the mud, the other being a liquid which is removed. By hydrolysis of the agent which maintains the homogeneity of the liquid, its physical nature has been altered to allow the two phases to be separated.

In contrast to what is described above, the present invention is aimed at modifying the mud chemically in order to accelerate thereby its bacteriological degradation.

In the context of the present invention, mud is intended to mean any pure synthetic organic phase containing especially esters and employed as, drilling mud, any cuttings consisting of rocks impregnated with mud and the crude muds obtained after screening out the cuttings, still containing rock fines.

The subject of the present invention is therefore a process for the treatment of synthetic organic drilling muds recovered at the surface of the ground, characterized in that it comprises at least one stage of hydrolysis of the said mud by means of a lipase. This stage is preferably carried out at a basic pH, at a temperature which is lower than 60° C. More particularly the chosen pH is higher than 9 and preferably between 9 and 10.

Lipase is intended to mean a protein classified among enzymes, the natural function of which is to hydrolyse the ester bonds resulting from the esterification of a fatty acid with an alcohol and, more particularly, triglycerides.

In the process according to the invention preference is given to lipases of the group consisting of lipases of triacylglycerol hydrolase type from fungal and animal sources.

In the case of the process for the treatment of muds according to the invention, preference will be given to the triacylglycerol acyl hydrolases systematically named 3.1.1.3, also called triacylglycerol lipases, triglyceride lipases or else tributyrases.

The hydrolysis treatment according to the invention is particularly suited to a treatment of ester-based replacement synthetic muds preceding the bacteriological treatment aimed at destroying them before dumping the waste at sea. In a preferred method of the invention this process includes at least one stage of pretreatment of the mud, which consists in introducing a necessary quantity of lipase into the latter in the presence of 30 to 50% by weight of water, in maintaining the pH between 9 and 10 and the temperature below 60° C. and in agitating the mixture, and then at least one stage of bacteriological treatment which consists in introducing a necessary quantity of bacteria into the mixture. The greater the quantity of lipase in the process according to the invention, the greater the acceleration of the biodegradation of these muds, until the esters are completely hydrolysed.

The process is advantageous whatever the bacteria subsequently employed, that is to say marine bacteria cultured in a synthetic liquid medium or else bacteria which are adapted and selective in degrading fat, of which the triglycerides form part.

Another advantage of the process according to the invention is that it is so-called aerobic, that is to say that it can be applied in the presence of oxygen.

In the context of the present invention the muds to be treated contain esters of acids of the class consisting of the monoesters and polyesters of carboxylic acids resulting from the esterification reaction of alcohols containing a saturated or unsaturated, linear or branched chain containing from 1 to 15 carbon atoms with a mono-, di- or polycarboxylic acid containing saturated or unsaturated, linear or branched chains containing from 6 to 30 carbon atoms.

In a preferred method of the invention the esters of mono-, di- and tricarboxylic acids will be preferably treated, the ester groups containing from 1 to 8 carbon atoms and the chains of each acid containing from 6 to 18 carbon atoms.

The process according to the invention is preferably applied to replacement muds containing esters, brought up from the bottom of the well bore, especially from offshore wells, whether they are or are not laden with drill cuttings or impregnated into these cuttings.

FIG. 1 and the examples below are given to illustrate the advantages of the present invention, without any limitation being implied.

EXAMPLE 1

The aim of this example is to illustrate the hydrolysis of ester mixtures sold as replacement muds in aqueous emulsion, using lipases.

Three ester mixtures employed as replacement muds were taken as reference:

S1 is the Petrofree ester mixture,

S2 is the Finagreen ester mixture and

S3 is the Total 8110 ester mixture.

S1, S2 and S3 are emulsified in water to give a 50:50 ester mixture:water ratio. These emulsions are stabilized by adding 0.3% by weight of polyvinyl alcohol. The operation is carried out while the pH of the emulsion is maintained at 9 and the temperature at 40° C.

The suitability of three fungal lipases for the hydrolysis is tested; these are: esterase, corresponding to a fungal lipase, sold by Gist Brocades, lipase S, corresponding to a fungal lipase, sold by Gist Brocades, and lipolase, sold by Novo Noradisk.

The hydrolysis is assessed from the quantity of free fatty acids formed during the reaction of the lipase with the esters; a pH stabilizer is employed, showing the quantity of sodium hydroxide needed to neutralize the free fatty acids formed as a function of time, at constant pH. The degree of hydrolysis thus corresponds to the gradient at the origin of the curve of acid formation in the course of time, this degree being expressed per mg of lipase.

The results obtained, which express the hydrolytic activity of these lipases per mg of lipase employed, are collated in the table below.

TABLE 1

|  | S1 | S2 | S3 |
| --- | --- | --- | --- |
| ESTERASE | 0.875 | 0.500 | 0.500 |
| LIPOLASE | 0.500 | 0.500 | 0.750 |
| LIPASE S | 1.000 | 0.875 | 0.500 |

It is found that these three lipases have an equivalent hydrolysing ability; however, lipase S is more effective in the case of the Samples S1 and S2 of Petrofree and of Finagreen, whereas lipolase is more effective in respect of S3, a sample of Total N 8110.

EXAMPLE 2

This example described the hydrolysis of formulated drilling muds, the Petrofree mud or B1, the Finagreen mud or B2 and the Total N 8110 mud or B3. As in Example 1, the effectiveness of the three lipases, esterase, lipolase and lipase S, will be tested.

150 ml of mud are taken into a flask, the pH is adjusted to 9 and the temperature to 40° C. and the lipase whose hydrolytic activity it is intended to measure is added gradually while the flask is agitated.

As in Example 1, the quantity of free fatty acids formed as a function of time is measured. The results relating to the activity of the lipases which are tested are collated in Table 2, which follows.

TABLE 2

|  | B1 | B2 | B3 |
| --- | --- | --- | --- |
| ESTERASE | 1.17 | 0.66 | 0.75 |
| LIPOLASE | 1.953 | 1.19 | 1.008 |
| LIPASE S | 1.36 | 1.85 | 0.89 |

The results confirm that, even in formulated muds, the esters are hydrolysed. It is found that these results are appreciably better than in Example 1, insofar as the esters are better dispersed in the muds than in the emulsions and therefore offer a larger reaction surface that is available to the lipases.

EXAMPLE 3

The aim of this example is to illustrate the hydrolysis of the esters trapped in the drill cuttings following the impregnation of these cuttings by the drilling muds, and more particularly by the Petrofree mud or B1.

In this example we restricted ourselves to testing the effectiveness of lipolase. This effectiveness was assessed by measuring the final concentration of free fatty acids and of esters in a suspension of cuttings before and after treatment with lipolase. The quantities of the various compounds are obtained by gas phase chromatography or by colorimetry according to a procedure which is know per se.

The suspension of cuttings is obtained by mixing one gram of cuttings with one gram of water and continually agitating the mixture. Lipolase is added to the suspension to obtain contents varying between 2.5 mg/g and 10 mg/g in the suspension. Of course, the pH is maintained at 9 and the temperature at 40° C. throughout the operations. To perform the measurements, the fatty acids and the esters are extracted with dichloromethane after acidifying the suspension before or after treatment with the enzyme.

The test results are collated in Table 3 below; they correspond to the hydrolysis of 100 g of cuttings for two hours.

TABLE 3

| | 0 mg/g | 2.5 mg/g | 5 mg/g | 10 mg/g |
| --- | --- | --- | --- | --- |
| Lipolase concentration | | | | |
| Esters present in g/100 g cuttings | 2.39 | 1.5 | 1.215 | 1.0 |
| Fatty acid g/100 g cuttings | 0 | 0.3075 | 0.625 | 0.784 |

These results confirm that the esters present in the cuttings are indeed hydrolysed by lipases, in this case lipolase.

EXAMPLE 4

This example tends to illustrate the accelerating effect of the pretreatment by enzymatic hydrolysis according to the invention on the biodegradation of the replacement muds. For this purpose, we compared the effectiveness of the biodegradation on Petrofree, Finagreen and Total N 8110 muds, that is B1, B2 and B3, hydrolysed and unhydrolysed, by bacteria capable of degrading fats, including triglycerides; here bacterial aliquots are suspended in a 50/50 mixture of mud and water at pH 7. To follow this biodegradation by the bacteria, the residual COD of the liquid phase is measured after separation of the liquid and solid phases by centrifuging.

The COD measurements as a function of time, on hydrolysed and unhydrolysed muds before and after inoculation with bacteria, are collated in Table 4 below.

The muds were hydrolysed for 2 h 30 min with lipolase and were then inoculated with the bacterial suspension by a method which is known per se.

TABLE 4

| time/day | B1 | | B2 | | B3 | |
| --- | --- | --- | --- | --- | --- | --- |
| | with | without | with | without | with | without |
| 0 | 1000 | 1000 | 970 | 970 | 970 | 970 |
| 1 | 380 | 900 | 800 | 950 | 730 | 950 |
| 2 | 340 | 820 | 730 | 900 | 670 | 850 |
| 3 | 300 | 750 | 700 | 800 | 630 | 760 |

These results show that the muds hydrolysed before the addition of bacteria are biodegraded more rapidly. This effect is particularly appreciable on the Petrofree mud B1. Acceleration of the biodegradation does therefore take place if this treatment is preceded by an enzymatic hydrolysis.

EXAMPLE 5

The aim of this example is to illustrate the accelerating effect of the pretreatment by enzymatic hydrolysis according to the invention on the biodegradation of the replacement muds impregnated into cuttings.

The mud B4 impregnated into the cuttings has the following constitution:

| | |
| --- | --- |
| Petrofree-type ester mixture | 451.5 g |
| Emulsifier | 29 g |
| Asphalt | 20 g |
| CaCl$_2$ | 32 g |
| Water | 56 g |
| Lime | 3 g |
| Densifier, 5 μm | 340 g |
| Densifier, 10 μm | 680 g |

(*densifier: calcium carbonate or marble powder)

The cuttings, pretreated or not pretreated with lipolase, are seeded in order to contain at least $10^7$ bacteria per ml after seeding. The culture medium is made up of 50% of hydrolysed or unhydrolysed muds and 50% of water. The pH of the mixture is adjusted approximately to 7. The bacteria employed for the seeding are bacteria which are adapted to the degradation of fats (including triglycerides).

The results are shown in FIG. 1 below.

From these graphs it is concluded that, in the absence of enzyme pretreatment, even with bacteria selected for fat degradation, there is a latent period of approximately 120 hours in this case during which the impregnated mud is hardly degraded.

We claim:

1. Process for the treatment of synthetic organic drilling mud recovered at the surface of the ground, comprising the steps of:
   collecting said mud; and
   performing at least one first stage of hydrolysis of at least one carboxylic acid ester present in said mud, wherein said hydrolysis of at least one carboxylic acid ester is performed using a lipase.
2. Process according to claim 1, wherein the hydrolysis stage is carried out at a basic pH and at a temperature which is lower than 60° C.
3. Process according to claim 2, wherein the pH is higher than 9.
4. Process according to claim 1, wherein the lipase is a triacylglycerol hydrolase type lipase obtained from fungal and animal sources.
5. Process according to claim 1, wherein the lipase is a triacylglycerol acyl hydrolase systematically named 3.1.1.3.
6. Process according to claim 1, which further comprises at least one stage of pretreatment of the mud, wherein said pretreatment stage comprises
   introducing a necessary quantity of lipase into the mud;
   maintaining the pH between 9 and 10 and the temperature below 60° C.; and
   agitating the mixture, wherein said parameters of introducing, maintaining and agitating are followed by at least one stage of bacteriological treatment which comprises introducing a necessary quantity of bacteria into the mixture.
7. Process according to claim 1, wherein the mud contains at least one carboxylic acid ester selected from the group consisting of monoesters, diesters and polyesters of carboxylic acids, wherein said monoesters, diesters and polyesters of carboxylic acids are obtained from esterification of alcohols containing a saturated or unsaturated, linear or branched chain containing from 1 to 15 carbon atoms with at least one mono-, di or polycarboxylic acid containing saturated or unsaturated, linear or branched chains containing from 6 to 30 carbon atoms.
8. Process according to claim 1, wherein the mud contains at least one compound of the group consisting of esters of mono-, di- and tricarboxylic acids, and wherein the ester groups contain from 1 to 8 carbon atoms and the chains of each acid contain from 6 to 18 carbon atoms.
9. Process according to claim 1, wherein the mud is selected from the group consisting of organic phase containing esters, rocks impregnated with organic phase containing esters and mud recovered after screening out cuttings.
10. A method for the treatment of replacement mud laden with drill cuttings comprising:
    obtaining said mud; and
    subjecting said mud to the process according to any one of claims 1–9.
11. Method according to claim 10, wherein said mud is recovered offshore.
12. Process according to claim 3, wherein the pH is between 9 and 10.
13. Process according to claim 6, wherein said bacteria is marine bacteria cultured in a synthetic liquid medium.
14. Process according to claim 6, wherein said bacteria degrades fat.
15. Process according to any one of claims 13 and 14, wherein said bacteria is aerobic.

* * * * *